US009436445B2

(12) United States Patent
Wang et al.

(10) Patent No.: US 9,436,445 B2
(45) Date of Patent: Sep. 6, 2016

(54) DRAG-AND-DROP FUNCTIONALITY FOR SCALABLE VECTOR GRAPHICS

(71) Applicant: VMware, Inc., Palo Alto, CA (US)

(72) Inventors: Jialiang Wang, San Jose, CA (US); Komal Nitin Mangtani, Los Altos, CA (US); Sesh Jalagam, Union City, CA (US)

(73) Assignee: VMware, Inc., Palo Alto, CA (US)

( * ) Notice: Subject to any disclaimer, the term of this patent is extended or adjusted under 35 U.S.C. 154(b) by 236 days.

(21) Appl. No.: 14/312,297

(22) Filed: Jun. 23, 2014

(65) Prior Publication Data

US 2015/0370542 A1   Dec. 24, 2015

(51) Int. Cl.
*G06F 9/44* (2006.01)

(52) U.S. Cl.
CPC ....................................... *G06F 8/38* (2013.01)

(58) Field of Classification Search
CPC .................................. G06F 8/38; G06F 9/44
USPC ......................................................... 717/114
See application file for complete search history.

(56) References Cited

U.S. PATENT DOCUMENTS

| | | | |
|---|---|---|---|
| 6,011,559 A | 1/2000 | Gangopadhyay et al. | |
| 6,836,821 B2 | 12/2004 | Moore et al. | |
| 7,210,095 B1 * | 4/2007 | Mor ................... | G06F 17/30893 707/E17.117 |
| 7,290,216 B1 * | 10/2007 | Kawahara ............... | G06T 17/00 715/762 |
| 7,725,820 B2 | 5/2010 | Gibbons et al. | |
| 7,800,614 B2 * | 9/2010 | Johnson .................... | G06F 9/54 345/440 |
| 7,827,527 B1 * | 11/2010 | Chiluvuri .................. | G06F 8/30 717/104 |
| 7,889,579 B2 | 2/2011 | Faue | |
| 8,392,877 B1 * | 3/2013 | Chiluvuri .................. | G06F 9/44 717/106 |
| 8,397,153 B1 | 3/2013 | Lee et al. | |
| 8,429,140 B1 | 4/2013 | Lolayekar et al. | |
| 8,527,943 B1 * | 9/2013 | Chiluvuri .................. | G06F 8/30 717/106 |
| 8,560,671 B1 | 10/2013 | Yahalom et al. | |
| 8,738,745 B1 | 5/2014 | Brandwine et al. | |
| 8,910,156 B1 | 12/2014 | Kenchammana-Hosekote et al. | |
| 8,984,448 B2 * | 3/2015 | Lewin .................... | G06F 9/4443 715/788 |
| 9,046,982 B2 * | 6/2015 | Horsman ................. | G06F 3/048 |
| 9,075,631 B2 * | 7/2015 | Lewin .................... | G06F 9/4443 715/788 |
| 9,195,362 B2 * | 11/2015 | Lewin .................... | G06F 9/4443 |
| 2002/0109729 A1 | 8/2002 | Dutta | |
| 2003/0128390 A1 | 7/2003 | Yip et al. | |
| 2004/0111672 A1 | 6/2004 | Bowman et al. | |
| 2004/0111673 A1 | 6/2004 | Bowman et al. | |
| 2004/0140992 A1 | 7/2004 | Marquering et al. | |
| 2004/0254864 A1 | 12/2004 | Mitsuoka et al. | |
| 2005/0015755 A1 | 1/2005 | Holmes et al. | |
| 2005/0278440 A1 | 12/2005 | Scoggins | |
| 2006/0041661 A1 | 2/2006 | Erikson et al. | |
| 2007/0016592 A1 | 1/2007 | Ferla et al. | |
| 2007/0054670 A1 | 3/2007 | Kalika et al. | |

(Continued)

*Primary Examiner* — William Titcomb

(57) ABSTRACT

A graphical user interface (GUI) engine receives an input event associated with a drag-and-drop action, determines a Scalable Vector Graphics (SVG) element that relates to the input event, and causes an anchor element to be attached to the SVG element, such as be wrapping the SVG element with the anchor element. Attaching an anchor element to an SVG element and defining the anchor element as "drag- gable" enables web browsers to perform drag-and-drop actions with SVG elements in a uniform and predictable manner. In one example use case, an SVG element may be wrapped with an anchor element when the SVG element is selected and dragged by a user, enabling an accurate repre- sentation of the SVG element to be displayed while the user is performing the drag-and-drop action.

20 Claims, 3 Drawing Sheets

(56) References Cited

U.S. PATENT DOCUMENTS

| | | |
|---|---|---|
| 2007/0214206 A1 | 9/2007 | Malloy et al. |
| 2007/0242082 A1* | 10/2007 | Lathrop ............ G06F 17/30271 345/619 |
| 2008/0095176 A1 | 4/2008 | Ong et al. |
| 2008/0208790 A1* | 8/2008 | Oshima ................ G06F 17/241 |
| 2008/0244595 A1 | 10/2008 | Eilam et al. |
| 2008/0262833 A1* | 10/2008 | Kano .................. G06F 17/2247 704/10 |
| 2010/0094819 A1 | 4/2010 | Bornhoevd et al. |
| 2010/0171750 A1 | 7/2010 | Eberhard et al. |
| 2010/0322527 A1 | 12/2010 | Fablet et al. |
| 2011/0029882 A1 | 2/2011 | Jaisinghani |
| 2011/0126129 A1 | 5/2011 | Nagahara et al. |
| 2012/0192047 A1* | 7/2012 | Slatter .................. G06F 17/248 715/202 |
| 2012/0192092 A1* | 7/2012 | Slatter .................. G06F 17/248 715/769 |
| 2012/0303670 A1 | 11/2012 | Gillen et al. |
| 2012/0330984 A1* | 12/2012 | Fablet ................ G06F 17/2247 707/755 |
| 2013/0019189 A1* | 1/2013 | Stewart ............... G06F 17/3089 715/760 |
| 2013/0132850 A1 | 5/2013 | Subramanian et al. |
| 2013/0145118 A1 | 6/2013 | Liu et al. |
| 2013/0151707 A1 | 6/2013 | Boutin et al. |
| 2013/0232463 A1* | 9/2013 | Nagaraja .................. G06F 8/61 717/101 |
| 2013/0232480 A1* | 9/2013 | Winterfeldt ............... G06F 8/60 717/177 |
| 2013/0232497 A1* | 9/2013 | Jalagam ................ G06F 9/5072 718/104 |
| 2013/0232498 A1* | 9/2013 | Mangtani ............... G06F 9/5072 718/104 |
| 2013/0305130 A1* | 11/2013 | Slatter .................... G06Q 30/06 715/202 |
| 2014/0025816 A1 | 1/2014 | Otani |
| 2014/0379898 A1 | 12/2014 | Schmit et al. |
| 2015/0113453 A1 | 4/2015 | Thimbleby |

\* cited by examiner

DRAG-AND-DROP FUNCTIONALITY FOR SCALABLE VECTOR GRAPHICS

CROSS-REFERENCE TO RELATED APPLICATIONS

This application is related to the following commonly assigned, co-pending applications: "HTML5 Graph Layout for Application Topology" (Ser. No. 14/307,963), which was filed on Jun. 18, 2014, "HTML5 Graph Overlays for Application Topology" (Ser. No. 14/307,997), which was filed on Jun. 18, 2014, and "Connection Paths for Application Topology" (Ser. No. 14/307,981), which was filed on Jun. 18, 2014, each of which is incorporated by reference herein in its entirety.

BACKGROUND

HyperText Markup Language 5 (HTML5) is an increasingly popular markup language used for structuring and presenting content for the World Wide Web. Notably, HTML5 introduces native support for drag-and-drop functionality. Drag-and-drop functionality allows a user to select and drag user interface (UI) elements, enabling developers to provide more interactive and responsive web content. HTML5 implements drag-and-drop functionality using an event-based mechanism that permits a wide variety of UI elements to be defined as "draggable."

Another component of HTML5 is the Scalable Vector Graphics (SVG) specification. SVG is an XML-based vector image format for describing two-dimensional graphics applications and images, and a set of related graphics script interfaces. While SVG is a powerful graphic specification, individual SVG elements (e.g., shapes, images, and text) do not properly respond to HTML5 drag-and-drop events. For example, attempting to drag-and-drop a specific SVG element contained within a parent SVG module will cause the entire SVG module to be selected and dragged, providing a poor user experience and interfering with application functionality. Consequently, developers typically are unable to utilize SVG elements in applications that require drag-and-drop functionality. Accordingly, there are challenges for developers seeking to create a web-based graphical user interface that supports drag-and-drop functionality.

SUMMARY

Accordingly, one or more embodiments provide a graphical user interface (GUI) engine that receives an input event associated with a drag-and-drop action, determines a Scalable Vector Graphics (SVG) element that relates to the input event, and causes an anchor element to be attached to the SVG element, such as be wrapping the SVG element with the anchor element. Because web browsers typically do not support drag-and-drop functionality with SVG elements, attaching an anchor element to an SVG element and defining the anchor element as "draggable" enables web browsers to perform drag-and-drop actions with SVG elements in a uniform and predictable manner. In one example use case, an SVG element may be wrapped with an anchor element when the SVG element is selected and dragged by a user, enabling an accurate representation of the SVG element to be displayed while the user is performing the drag-and-drop action. In another example use case, an SVG element may be wrapped with an anchor element when a separate element is dragged over and/or dropped onto the SVG element, enabling the SVG element to provide visual cues in response to drag-and-drop actions performed on the SVG elements via related user interface elements.

Embodiments of the present disclosure provide a method of performing a drag-and-drop action with a scalar vector graphics (SVG) element. The method includes receiving an input event associated with an SVG container element. The SVG container element includes the SVG element. The method further includes determining that the first input event corresponds to the SVG element, attaching an anchor element to the SVG element, and using the anchor element to perform the drag-and-drop action.

Embodiments of the present disclosure further provide a non-transitory computer-readable storage medium comprising instructions that, when executed in a computing device, perform the steps of, in an embodiment, receiving an input event associated with an SVG container element, where the SVG container element includes an SVG element. The non-transitory computer-readable storage medium further includes instructions for determining that the input event corresponds to the SVG element, attaching an anchor element to the SVG element, and using the anchor element to perform a drag-and-drop action.

Embodiments of the present disclosure further provide a computer system, including a system memory and a processor programmed to carry out the steps of, in an embodiment, receiving an input event associated with an SVG container element, where the SVG container element includes an SVG element. The system memory and processor are further programmed to carry out the steps of determining that the input event corresponds to the SVG element, attaching an anchor element to the SVG element, and using the anchor element to perform a drag-and-drop action.

DETAILED DESCRIPTION

Figure 1:
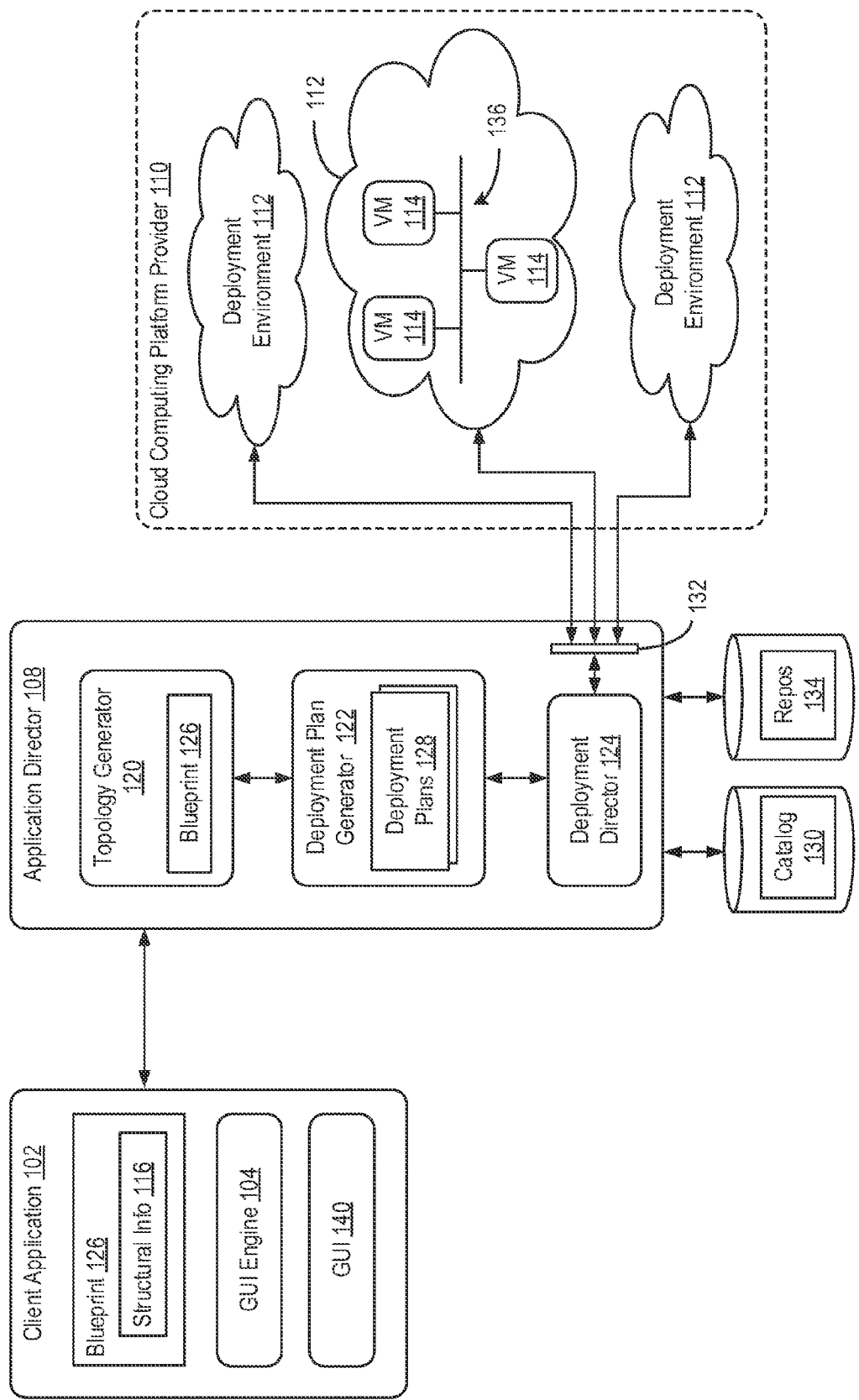
FIG. 1 depicts a system for generating a blueprint of an application to be deployed in a cloud computing environment, according to one embodiment of the present disclosure.

FIG. 1 depicts a system 100 for generating a blueprint of an application to be deployed in a cloud computing environment, according to one embodiment of the present disclosure. Via user input selections, a client application 102 interacts with an application director 108 to generate a blueprint 126 that specifies a logical topology of an application 136 to be deployed. Client application 102 and application director 108 may be software applications running in different hosts and/or virtual machines (not shown) in a client-server relationship, or on a same host or virtual machine (VM). In one embodiment, application director 108 may be a web-based application that may be accessed via client application 102, e.g., a web browser, although other implementations may be used.

In one embodiment, client application 102 includes a graphical user interface (GUI) engine 104 configured to render a blueprint 126 for creation of a new blueprint or modification of an existing blueprint in a GUI 140 of client application 102. In one embodiment, GUI engine 104 may be a client-side library of scripting code provided by application director 108 and executable by client application 102 to programmatically render graphical elements (e.g., Scalable Vector Graphics (SVG) elements) included in GUI 140. In some implementations, e.g., where application director 108 is a web-based application, GUI engine 104 is a JavaScript library downloaded from application director 108 to render a GUI 140 comprised of web documents, e.g., HTML, SVG, Cascading Style Sheets (CSS). For example, when a user directs client application 102 to access a Uniform Resource Locator (URL) pre-assigned to application director 108, application director 108 may return in response web documents (e.g., HTML, CSS, SVG), client-side code (e.g., JavaScript, in-line or linked files) which may include GUI engine 104 and multimedia files (e.g., GIFs, Flash, MPEGs) that client application 102 uses to render GUI 140. While the present disclosure describes functions performed by each of client application 102 and application director 108, it should be noted that other embodiments may differently distribute functions between client application 102 and application director 108, i.e., shifting more functionality server-side or client-side.

In operation, a user (e.g., software developer) may access application director 108 via client application 102 to design a topology for and orchestrate deployment of a multi-tier application 136 onto one of deployment environments 112 provided by a cloud computing platform provider 110. In one implementation, the user may utilize a graphical user interface provided by application director 108 to assemble and arrange items from a catalog into an application blueprint 126, for an application to be deployed, that includes a logical topology of virtual computing resources and application components for supporting application 136. Cloud computing platform provider 110 (sometimes referred to simply as "cloud provider") may provide multiple deployment environments 112, for example, for development, testing, staging, and production of the application. Services may be accessed from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which the user can deploy its multi-tier application. One particular example of a deployment environment is one implemented using cloud computing services from a vCloud DataCenter available from VMware, Inc.

In one embodiment, application director 108 includes the following software modules: a topology generator 120, a deployment plan generator 122, and a deployment director 124. Topology generator 120 generates a blueprint 126 that specifies a logical topology of the application 136 to be deployed. As mentioned earlier, blueprint 126 generally captures the structure of an application 136 as a collection of application components executing on virtual computing resources.

Blueprint 126 provides a visual representation of an application's architecture, including, in some embodiments, one or more virtual machines (VMs) nodes, software services within the VM nodes, executable components within the VM nodes or software services. Blueprint 126 further provides a visual representation of component dependency connections. The dependency connections represent the architectural relationship between blueprint components and affect various lifecycles of the application. For instance, if a service A depends on service B, during deployment, the installation and configuration of service A will be waiting for the completion of service B. In some embodiments, blueprint 126 may visually represent one or more logical networks, for example, via visual aids to conventionally distinguish and manage logical networks between VM nodes.

For example, blueprint 126 generated by application director 108 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is noted that the term "application" is used herein to generally refer to a logical deployment unit, comprised of application packages and their dependent middleware and operating systems. As such, in the example described above, the term "application" may refer to the entire online store application, including application server and database components, rather than just the application logic of the web application itself.

Blueprint 126 may be assembled out of items from a catalog 130, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. Catalog 130 may be pre-populated and customized by an administrator (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, the user may specify a dependency from an Apache service to an application code package.

Deployment plan generator 122 of application director 108 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 136. Different deployment plans 128 may be generated from a single blueprint 126 to test prototypes (e.g., new application versions), to scale-up and scale down deployments, or deploy application 136 to different deployment environments 112 (e.g., testing, staging, production).

Deployment director 124 of application director 108 executes deployment plan 128 by communicating with cloud computing platform provider 110 via a cloud interface 132 to provision and configure VMs 114 in a deployment environment 112, as specified by deployment plan 128. Cloud interface 132 provides a communication abstraction layer by which application director 108 may communicate with a heterogeneous mixture of cloud provider 110 and deployment environments 112. Deployment director 124 provides each VM 114 with a series of tasks specific to the receiving VM 114 (herein referred to as a "local deployment plan"). The tasks may be scripts that are executed by VMs 114 to install, configure, and/or start one or more application components. For example, a task may be a script that, when executed by a VM 114, causes VM 114 to retrieve and install particular software packages from a central package repository 134. Deployment director 124 coordinates with VMs 114 to execute the tasks in an order that observes installation dependencies between VMs 114 according to deployment plan 128. After application 136 has been deployed, application director 108 may be utilized to monitor and modify (e.g., scale) the deployment.

Figure 2:
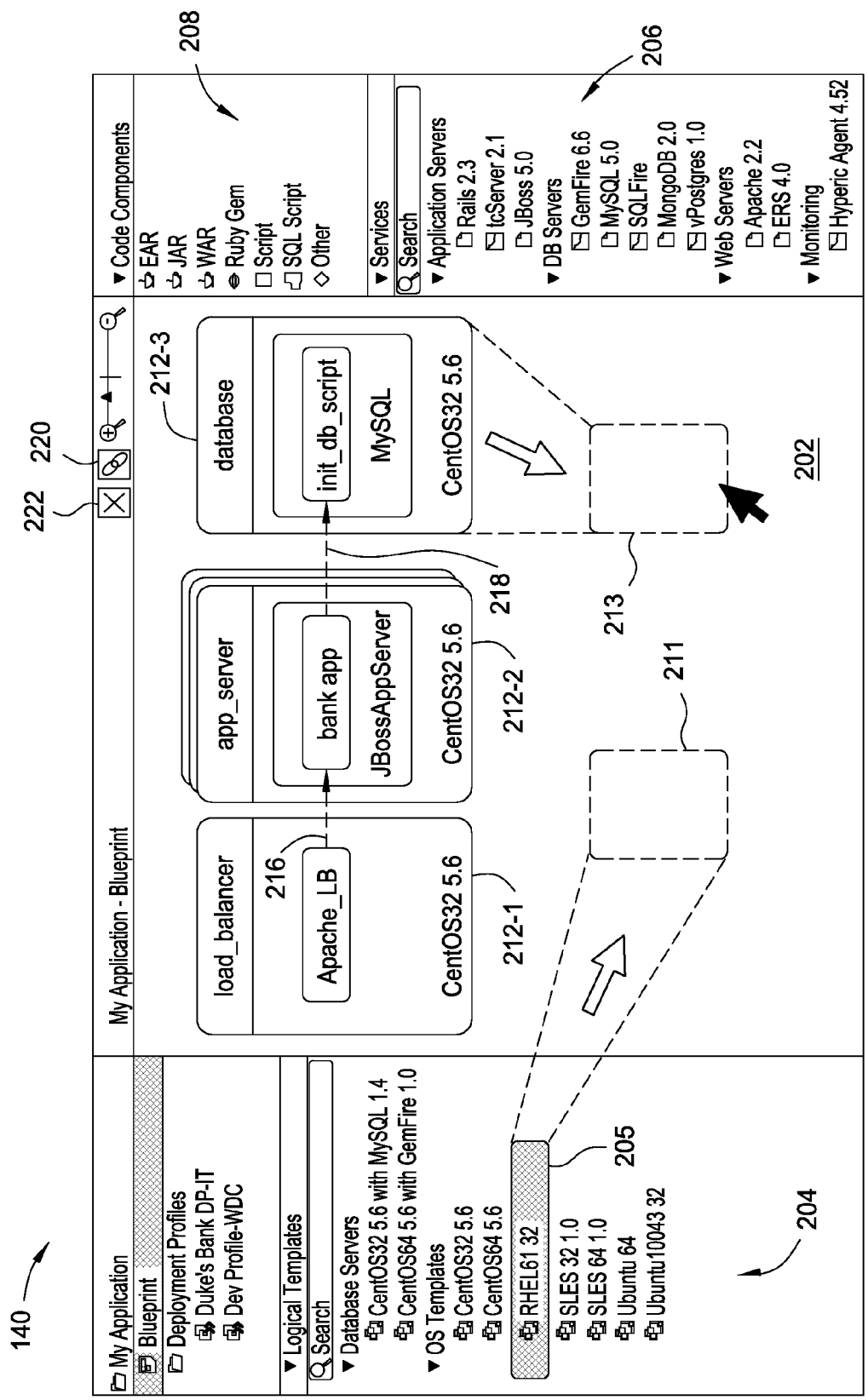
FIG. 2 illustrates an example graphical user interface for specifying an application blueprint for an application to be deployed.

FIG. 2 illustrates an example graphical user interface 140 for specifying a blueprint 126 for an application to be deployed. GUI 140 includes a canvas 202 that provides a graphical view of a blueprint 126 as a schematic diagram of application 136. GUI 140 may further include one or more "palettes" that display items from catalog 130 that are available for use in creating a blueprint.

In various embodiments, GUI engine 104 is configured to generate one or more "nodes" (e.g., nodes 212-1, 212-2, 212-3), which visually represent virtual computing resources (e.g., a virtual machine, or a cluster of virtual machines) configured according to a user's selection. GUI engine 104 may be configured to initially generate nodes 212 included in canvas 202 upon first loading of GUI 140 and may be configured to modify GUI 140 to add, remove, or modify the nodes responsive to user input (e.g., user drags in a new VM). In some embodiments, nodes 212, elements within nodes 212, and other elements displayed in canvas 202 are generated as SVG elements.

In the embodiment shown in FIG. 2, GUI 140 includes a first palette 204 that lists logical templates defined in and available from catalog 130, a second palette 206 that lists software services defined in and available from catalog 130, and a third palette 208 that lists types of code components that may be inserted into a blueprint.

In some embodiments, canvas 202 is generated using a parent element, such as an SVG container element, and nodes 212, application components, scripts, etc. contained within canvas 202 are generated using child elements, such as SVG elements (e.g., SVG container elements, shapes, graphics elements, text content elements, and the like) that are nested in the parent element. Further, content within each node 212 may be specified in a nested manner (e.g., as child elements of the node parent element). For example, node 212-2 may include a child element corresponding to the application component JBoss Application Server, which itself includes a child element corresponding to a code component ("bank_app"). In other implementations, other SVG container or structural elements, such as the <g> element used to group together elements, may be used. In some embodiments, palettes may be generated using the parent element/child SVG element hierarchy described above, or palettes may be generated using various types of HTML elements.

Canvas 202 is configured to provide drag-and-drop functionality to enable a user to select and drag SVG elements, such as nodes 212, dependencies, application components, etc. to modify blueprint 126. Additionally, drag-and-drop functionality may be provided to enable HTML elements (e.g., item 205) to be selected and dragged within the boundaries of canvas 202 to modify blueprint 126. While the user is dragging SVG elements and/or HTML elements, a representation, such as a partially transparent version of the element, may be displayed to the user. The representation may visually interact with SVG elements and HTML elements based on input events, such as drag-and-drop events (e.g., dragEnter, dragOver, dragLeave, drop, etc.) that cause visual characteristics of the elements to be modified.

A blueprint may include one or more instances of logical templates, which specify virtual computing resources for a virtual machine, such as CPU, memory, networking, storage, guest operating system, pre-installed installed runtime environments (e.g., Java Runtime Environment), and application services and commands (e.g., ssh, wget). For example, one logical template may specify a virtual machine having a 2 GB of RAM, a dual-core CPU, and pre-installed guest operating system CentOS version 5.6 supporting 32-bit architecture, while another logical template may specify a virtual machine having Red Hat Enterprise Linux 6.1 supporting 64-bit architecture. Logical templates enable application director 108 to define an application topology in a cloud-agnostic manner. In some embodiments, the logical templates may be mapped to virtual machine templates made available by cloud provider 110 (referred to herein as "cloud templates".)

In one example, to create a blueprint that models a three-tiered application, a user may select three items from palette 204 of logical templates, drag the items onto canvas 202, and create three nodes representing each tier of the application. In the example shown in FIG. 2, a three-tiered application with a database backend, an application server, and a load balancer is visually represented by three nodes 212 (labeled as "load balancer," "app_server," and "database"). Each node 212 has been created from a logical template (identified as "CentOS32 5.6") having CentOS 5.6 32-bit operating system installed.

A blueprint 126 may further include one or more application components, such as software services and code components, to be installed on a virtual machine for supporting execution of an application. Code components refer to application-specific binaries, scripts, or processes, for example, written by a developer and packaged into one or more files, to provide logic for the application. In catalog 130, code components are represented as types or formats of scripting and application code. Examples of types of code components include Java Archive (JAR) files, Java Enterprise Archive (EAR) files, Java web application archive (WAR) files, Ruby Gems packages, SQL scripts, and other suitable modules of scripting logic. Services are scripted software that provide a software infrastructure for an application, and are generally reused in multiple applications. Examples of services include application servers (e.g., Rails, Apache Tomcat, JBoss), database servers (e.g., GemFire, MySQL, SQLFire, MongoDB, Postgres), monitoring services (e.g., Hyperic, SpringInsight), web servers (e.g., Apache, VMware vFabric Enterprise Ready Server), messaging services (e.g., RabbitMQ), and other middleware services.

In one embodiment, application components may be added to a node 212 within canvas 202 (e.g., via a drag-and-drop action) to specify which application components are to execute on the node. For example, the user may select an application component (e.g., code component, software service) from palettes 206, 208 and drag the item into a node 212 within canvas 202 to specify the node should have the selected item executing therein. In the example three-tiered application in FIG. 2, a user has added a MySQL database item, a JBoss application server, and an Apache web server from palette 206 of services to nodes 212. Each node may host multiple application components. Some application components, such as services, may host, execute, and/or deploy certain application components themselves, such as code components. In the three-tiered application example above, the user specifies an application component packaged as an EAR file (identified as "bank_app") as being deployed in the JBoss application server. In another example, the user may specify an SQL script (identified as "init_db_script") that is executed by the MySQL database to initialize the database.

In one embodiment, GUI engine 104 may be configured to render deployment-related dependencies 216, 218 between application components and/or nodes within canvas 202. The user may select two application components within canvas 202 using a pointer cursor in GUI 140, and create a dependency between the application components via a link button 220. It is appreciated that the user may later use a pointer cursor to select an existing dependency and delete and/or modify the selected dependency, for example, by pressing a delete button 222. The user may further use drag-and-drop actions to modify dependencies between application components. In the three-tiered application example shown in FIG. 2, a dependency from the Apache load balancer to code component (e.g., "bank_app") is depicted by dashed arrow 216 and represents that the Apache load balancer should be deployed after the installation of the code component (e.g., "bank_app") is completed. Similarly, a second dependency (depicted by dashed arrows 218) from the code component (e.g., "bank_app") to the database initialization script (e.g., "init_db_script") is created to represent that the code component (e.g., "bank_app") should wait until the database node, the database service, and the SQL script initializing the database have all been run before continuing.

In various embodiments, blueprint 126 is rendered using Scalable Vector Graphics (SVG), which is an XML-based vector image format supported by web browsers and other applications (e.g., client application 102). While SVG is a powerful graphics specification, SVG elements are unable to answer to drag-and-drop events defined by the HTML5 specification. Consequently, web browsers typically do not support performing drag-and-drop actions with SVG elements. For example, with reference to FIG. 2, because nodes 212 included in canvas 202 do not support drag-and-drop events (e.g., drag and dragStart), if a user attempts to select and drag node 212-1 to modify blueprint 126, the corresponding drag-and-drop events will be received by the SVG container element associated with canvas 202. The drag-and-drop action will then cause a representation of the entire canvas 202 to be selected and dragged. Additionally, when attempting to select item 205 and insert item 205 into blueprint 126, the corresponding drag-and-drop events (e.g., dragEnter, dragOver, drop, etc.) will be recognized only by canvas 202—not individual nodes 212 included in canvas 202—preventing visual feedback associated with the drag-and-drop action from being provided to the user and/or preventing item 205 from being inserted into the appropriate location on canvas 202.

In some browsers, such as the Google® Chrome™ browser, the inability of SVG elements to answer to drag-and-drop events may be mitigated by enabling a parent element (e.g., an SVG container element associated with canvas 202) to receive the coordinates of a drag-and-drop event and determine whether the drag-and-drop event relates to a specific child element (e.g., a nested SVG container, such as node 212-1) contained within the parent element. If the drag-and-drop event relates to a specific child element included in the parent element, then the representation associated with the drag-and-drop event (e.g., a representation of the entire canvas 202) may be dynamically replaced with an image that represents that child element, for example, by using a setDragImage( ) method. However, many browsers, such as the Microsoft® Internet Explorer® browser, do not enable drag-and-drop representations to be dynamically modified. As such, in these browsers, a representation of the parent element—not the child element—will be displayed when a drag-and-drop action is performed on a child element.

Accordingly, in various embodiments, a parent SVG element that contains one or more child SVG elements may listen for input events (e.g., drag-and-drop events) and, when an input event is received, determine the child SVG element, if any, to which the input event relates. An anchor element, such as a SVG <a> element (herein referred to as an "SVG anchor element"), may then be attached to the relevant child SVG element, and the anchor element may be used to perform the drag-and-drop action. In some embodiments, an anchor element is attached to an SVG element by wrapping the SVG element with the anchor element. In contrast to other types of SVG elements, an anchor element is recognized as both an SVG element and an HTML element. As such, an anchor element can be defined as "draggable," and, when a drag-and-drop action is performed on the anchor element, the web browser will display a representation 211, 213 of the underlying SVG element. Thus, attaching an anchor element to a child SVG element enables drag-and-drop actions to be performed on child SVG elements in any browser that implements the HTML5 specification.

Figure 3:
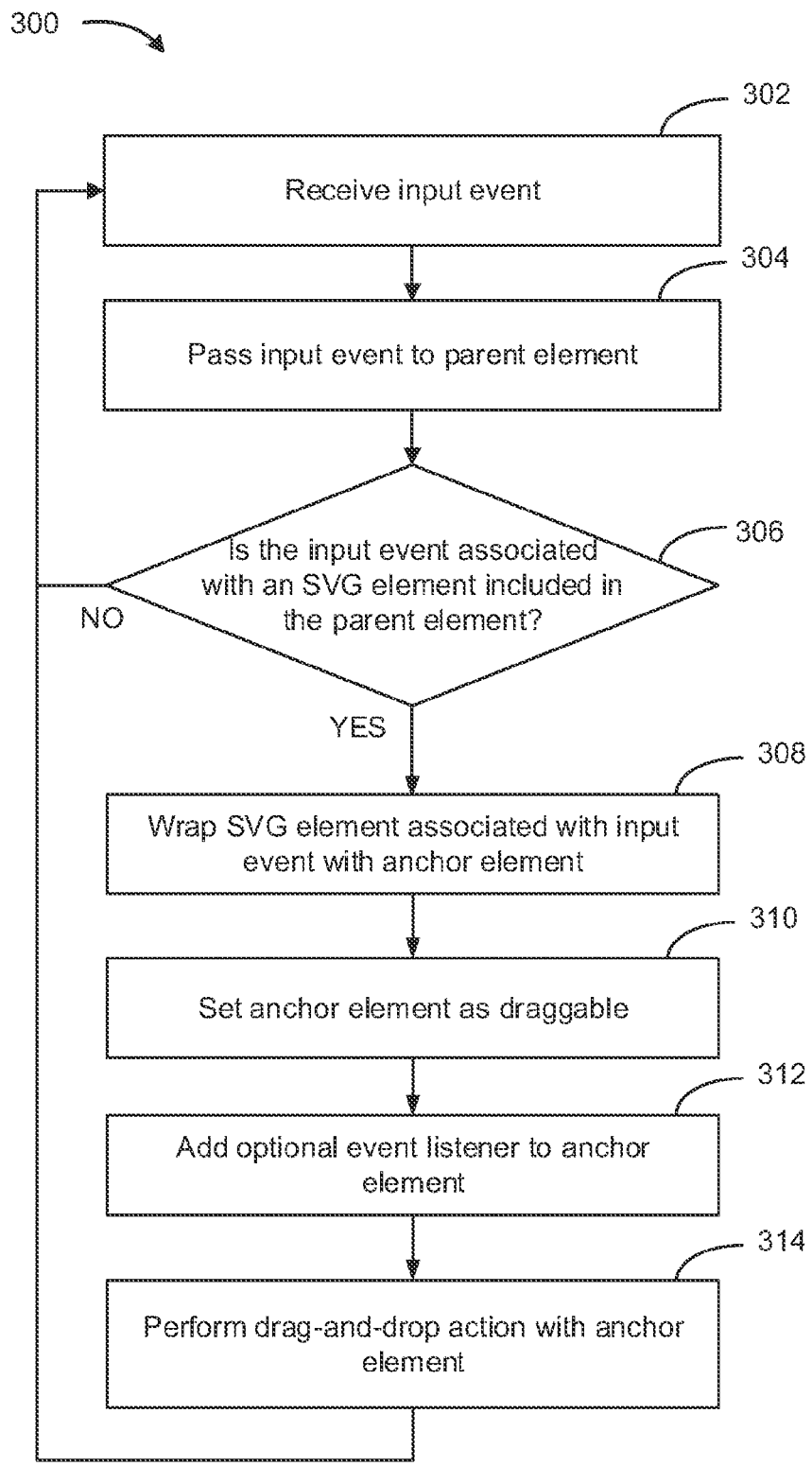
FIG. 3 is a flow diagram of a method for implementing drag-and-drop functionality with an SVG element, according to embodiments of the present disclosure.

FIG. 3 is a flow diagram of a method 300 for implementing drag-and-drop functionality with an SVG element, according to embodiments of the present disclosure. While the method 300 is described in conjunction with the system shown in FIG. 1, it is noted that other systems may be utilized to perform the method described herein.

At step 302, GUI engine 104 receives an input event associated with a drag-and-drop action. The input event may include, for example, a mouse click event, a mouse click-and-hold event, a hover event, a drag-and-drop event, or any other type of input event received from an input device (e.g., a mouse device) that is attempting to interact with an SVG element or HTML element included in GUI 140. In some embodiments, the input event is a mouse event or drag-and-drop event defined by the HTML5 specification.

The input event may include positional information that specifies the location (e.g., pixel-based coordinate values) at which the input event was received in GUI 140. For example, an input event (e.g., dragStart) may specify coordinates in GUI 140 when a user selects and drags an SVG element located at those coordinates. In another implementation, an input event (e.g., dragEnter and/or dragOver) may specify coordinates in GUI 140 when a user, while already dragging an SVG element or HTML element, enters and hovers over a particular SVG element located at those coordinates. Such an implementation may be useful when performing validation of potential drag-and-drop "drop zones" into which an element may be dragged and dropped. That is, GUI engine 104 may determine, on-the-fly, during a drag-and-drop action, whether the elements over which the selected element is being dragged are valid elements onto which the selected element can be dropped.

In some embodiments, validation of drag-and-drop drop zones may be performed to enable a user to more accurately compose application topologies. A visual cue may then be provided to the user to indicate whether a particular node 212 is a valid drop zone for an application component, such as to indicate whether the node 212 is compatible with the application component. For example, when a user selects and drags an SVG element over a valid drop zone, a transparent representation of the SVG element may be displayed to the user proximate to the user's mouse cursor, touch input location, etc., indicating that the SVG element could be dropped onto that drop zone. More specifically, a layout manager (e.g., GridGraphDnD class) may listen for an HTML 5 dragOver event using a division element (also known as a "<div> element" or "DIV element") associated with canvas 202. The dragOver event received by the DIV element may then indicate a target element on which the user would like to drop the selected SVG element. As such, because the target element (e.g., another SVG element) is known, data associated with the target element can be used to determine whether the target element is a valid drop zone. If validation is successful, the layout manager may call a function (e.g., GridGraphDnD.addDropZoneQ) to clone the selected SVG element associated with the drag-and-drop action, apply one or more Cascading Style Sheets (CSS) styles to make the cloned SVG element transparent, and display the transparent, cloned SVG element over the target element on which the selected SVG element may be dropped. In some embodiments, the layout manager may dispatch a validation event, which is routed to a business controller (e.g., a blueprint controller). The blueprint controller may store business-specific knowledge regarding validation of the drop zone, for example, based on meta data associated with the selected SVG element and/or the target element. For example, a blueprint node associated with a template may specify that the operating system of the blueprint node is Microsoft® Windows®. Consequently, if a user drags an Apache component—associated with a service data object which indicates that the Apache component is compatible with only the Linux® operating system—onto the blueprint node, then validation would fail, since the operating systems do not match. In another example, a service data object may declare that an associated target element supports only SQL SCRIPT components. Thus, if a user drags a non-SQL SCRIPT component onto the target element, an error message may be displayed to the user to indicate that the components are incompatible.

At step 304, GUI engine 104 passes the input event to an SVG container element located at the coordinates specified by the input event. In some embodiments, the input event may be received by an event listener associated with the SVG container element. At step 306, SVG container element determines whether the input event relates to a child SVG element included in the SVG container. Based on this determination, a response is transmitted to GUI engine 104. In some embodiments, the response is transmitted by an event dispatcher associated with the SVG container element. For example, upon receiving an input event via an event listener, the SVG container element may determine whether the coordinates of the input event intersect or otherwise relate to any of the child SVG elements included in the SVG container element. If the input event intersects or relates to a child SVG element, then the event listener may instruct the event dispatcher to dispatch an event response to the GUI engine 104 to indicate that the SVG container element is interested in the input event.

If the SVG container element determines that the input event does not relate to a child SVG element included in the SVG container element, then the method 300 returns to step 302. If the SVG container element determines that the input event relates to a child SVG element included in the SVG container element, then, at step 308, GUI engine 104 attaches an anchor element (e.g., an SVG anchor element) to the child SVG element, such as by wrapping the child SVG element with the anchor element. Next, at step 310, GUI engine 104 defines the anchor element as draggable, and, at step 312, adds an optional event listener to the anchor element.

Defining the anchor element as draggable enables the anchor element to respond to drag-and-drop events, such as dragStart and dragEnd. In addition, once the anchor element is defined as draggable, behaviors associated with various drag-and-drop events may be specified. For example, GUI engine 104 may define one or more functions that are called in response to the dragEnter, dragOver, and/or dragLeave events in order to provide visual cues to a user when an item is dragged over the anchor element. In another example, GUI engine 104 may define one or more functions that are called in response to the dragStart event. The function(s) may provide a visual cue when the anchor element itself is initially selected and dragged, such as by modifying the size and/or opacity of a representation of the child SVG element that is displayed while the anchor element is being dragged.

GUI engine 104 may attach an anchor element to a child SVG element, set the anchor element as draggable, and add an optional event listener to the anchor element by passing the child SVG element to an attachment function (e.g., wrapping function). In some embodiments, passing the child SVG element to the wrapping function is performed by passing a JavaScript content pane associated with the child SVG element to the wrapping function. An example function for wrapping a child SVG element with an SVG anchor element in order to perform a drag-and-drop action is shown in Table 1 below. While Table 1 depicts one particular function for wrapping a child SVG element with an anchor element, it is noted other functions and syntaxes may be used.

TABLE 1

Sample wrapping function

| 01 | getContentPane: function( ) { |
| 02 |    var me = this, element = me.element; |
| 03 |    if (element) { |
| 04 |       var contentPane = me.contentPane; |
| 05 |       if (!contentPane) { |
| 06 |          contentPane = SVGUtils.svg('a', { |
| 07 |             href: '#', |
| 08 |             draggable: true |
| 09 |          }); |
| 10 |          me.contentPane = contentPane; |
| 11 |          element.appendChild(contentPane); |
| 12 |          contentPane.addEventListener('click', function(event){ |
| 13 |             event.preventDefault( ); |
| 14 |          }); |
| 15 |       } |
| 16 |    } |
| 17 |    return me.contentPane; |
| 18 | } |

In the example shown in Table 1, the function creates an anchor element, referred to as "contentPane," that is to be attached to the child SVG element. The anchor element may be generated by calling a utility (i.e., lines 6-9), which may generate an anchor element and define the anchor element as draggable. A method call, such as appendChild( ), may then be used to dynamically insert the child SVG element into a DOM for rendering (i.e., line 11) so that the child SVG element may be displayed while the drag-and-drop action is performed. A method call, such as addEventListener( ), may be used to associate an event listener with the anchor element and to modify the default behavior of one or more input events (e.g., a click event) associated with the anchor element (i.e., lines 12-13). For example, by default, clicking an anchor element may cause a browser to navigate to a particular URL. As such, the default behavior of an anchor element may be modified to enable a user to select and drag the anchor element without causing the browser to navigate to a different webpage.

Referring back to FIG. 3, at step 314, GUI engine 104 performs the drag-and-drop action specified by the input event using anchor element. Accordingly, the SVG container element may listen to input events associated with drag-and-drop actions and respond to input events that relate to a child SVG element included in the SVG container element by wrapping the child SVG element with an anchor element. Thus, child SVG elements included in SVG container elements may be selected and properly displayed to a user, enabling the user to perform drag-and-drop actions with the child SVG elements.

In various embodiments, when a drag-and-drop action is performed, SVG elements on canvas 202 may be rearranged to accommodate the positions of new and/or repositioned SVG elements, for example, to avoid obscuring other child SVG elements when a drag-and-drop action is performed. To accomplish this, a layout manager may track and position SVG elements using a grid system, such that each SVG element occupies one or more grid cells. Then, when a drag-and-drop action occurs, the layout manager determines whether the selected SVG element is over an empty cell. If the selected SVG element is over an empty cell, then the layout manager determines that the selected SVG element can be placed inside of that cell. If the selected SVG element is not over an empty cell (e.g., the cell beneath the selected SVG element is occupied), then the layout manager determines another cell in which the selected SVG element may be placed, for example, based on the relative position of the user's cursor, touch input location, etc. and the cell(s) proximate to this position. For example, if a user's cursor is near the left edge of a particular cell, then the layout manager may determine that the selected SVG element should be placed in the neighboring cell that is to the left of that particular cell. If, however, the neighboring cell is occupied, a new column and/or row may be inserted into the grid to ensure that the selected SVG element can be placed into an empty cell. When a drag-and-drop action takes place, the layout manager may update the grid coordinates and cause an associated graph component, grid cell padding settings, etc. to be updated. The graph component may then update the root SVG elements' coordinates, causing a visual update to the graph component.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of performing a drag-and-drop action with a scalar vector graphics (SVG) element, the method comprising:
   receiving an input event associated with an SVG container element, wherein the SVG container element comprises the SVG element;
   determining that the input event corresponds to the SVG element;
   attaching an anchor element to the SVG element; and
   using the anchor element to perform the drag-and-drop action.

2. The method of claim 1, wherein using the anchor element to perform the drag-and-drop action comprises causing a representation of the SVG element to be displayed while performing at least a portion of the drag-and-drop action.

3. The method of claim 1, further comprising receiving coordinates associated with the input event, and wherein determining that the input event corresponds to the SVG element is performed by determining that the coordinates correspond to the SVG element.

4. The method of claim 1, wherein the SVG container element comprises a plurality of SVG elements, each SVG element associated with different coordinates.

5. The method of claim 1, further comprising setting the anchor element as draggable.

6. The method of claim 1, further comprising adding an event listener to the SVG container element, wherein the event listener receives the input event.

7. The method of claim 1, further comprising adding an event listener to the anchor element and defining a behavior of at least one drag-and-drop event associated with the anchor element.

8. The method of claim 1, wherein the anchor element comprises an SVG anchor element.

9. The method of claim 1, wherein attaching the anchor element to the SVG element is performed by wrapping the SVG element with a JavaScript content pane.

10. A non-transitory computer-readable storage medium comprising instructions that, when executed in a computing device, perform the steps of:
   receiving an input event associated with an SVG container element, wherein the SVG container element comprises an SVG element;
   determining that the input event corresponds to the SVG element;
   attaching an anchor element to the SVG element; and
   using the anchor element to perform a drag-and-drop action.

11. The non-transitory computer-readable storage medium of claim 10, further comprising instructions that, when executed in the computing device, perform the step of causing a representation of the SVG element to be displayed while performing at least a portion of the drag-and-drop action.

12. The non-transitory computer-readable storage medium of claim 10, further comprising instructions that, when executed in the computing device, perform the step of receiving coordinates associated with the input event, and wherein determining that the input event corresponds to the SVG element is performed by determining that the coordinates correspond to the SVG element.

13. The non-transitory computer-readable storage medium of claim 10, wherein the SVG container element comprises a plurality of SVG elements, each SVG element associated with different coordinates.

14. The non-transitory computer-readable storage medium of claim 10, further comprising instructions that, when executed in the computing device, perform the step of setting the anchor element as draggable.

15. The non-transitory computer-readable storage medium of claim 10, further comprising instructions that, when executed in the computing device, perform the step of adding an event listener to the SVG container element, wherein the event listener receives the input event.

16. The non-transitory computer-readable storage medium of claim 10, further comprising instructions that, when executed in the computing device, perform the step of adding an event listener to the anchor element and defining a behavior of at least one drag-and-drop event associated with the anchor element.

17. The non-transitory computer-readable storage medium of claim 10, wherein the anchor element comprises an SVG anchor element.

18. The non-transitory computer-readable storage medium of claim 10, wherein attaching the anchor element to the SVG element is performed by wrapping the SVG element with a JavaScript content pane.

19. A computer system, comprising a system memory and a processor programmed to carry out the steps of:
   receiving an input event associated with an SVG container element, wherein the SVG container element comprises an SVG element;
   determining that the input event corresponds to the SVG element;
   attaching an anchor element to the SVG element; and
   using the anchor element to perform a drag-and-drop action.

20. The computer system of claim 19, wherein the system memory and the processor are further programmed to carry out the step of causing a representation of the SVG element to be displayed while performing at least a portion of the drag-and-drop action.

* * * * *